US008712888B2

(12) United States Patent
Chisholm et al.

(10) Patent No.: US 8,712,888 B2
(45) Date of Patent: Apr. 29, 2014

(54) METHODS AND SYSTEMS FOR ASSESSING SALES ACTIVITY OF A MERCHANT

(75) Inventors: John D. Chisholm, Ballwin, MO (US); Paul Paolucci, West Harrison, NY (US); Teresa L. Bryan, O'Fallon, MO (US); John Brady, North Salem, NY (US)

(73) Assignee: MasterCard International Incorporated, Purchase, NY (US)

( * ) Notice: Subject to any disclaimer, the term of this patent is extended or adjusted under 35 U.S.C. 154(b) by 1264 days.

(21) Appl. No.: 11/966,411

(22) Filed: Dec. 28, 2007

(65) Prior Publication Data
US 2009/0171709 A1 Jul. 2, 2009

(51) Int. Cl.
*G06Q 40/00* (2012.01)
*G06Q 40/04* (2012.01)
*G06Q 40/06* (2012.01)
*G06Q 20/10* (2012.01)

(52) U.S. Cl.
CPC ............... *G06Q 40/00* (2013.01); *G06Q 40/04* (2013.01); *G06Q 40/06* (2013.01); *G06Q 20/10* (2013.01)
USPC .............................................. 705/35; 705/7

(58) Field of Classification Search
CPC .................................................... G06Q 20/10
USPC .......................................................... 705/35
See application file for complete search history.

(56) References Cited

U.S. PATENT DOCUMENTS

| 6,078,891 | A * | 6/2000 | Riordan et al. ............... 705/7.34 |
| 7,433,855 | B2 * | 10/2008 | Gavan et al. ..................... 706/47 |
| 7,953,630 | B2 * | 5/2011 | Fowler et al. .............. 705/14.26 |
| 2002/0120559 | A1 * | 8/2002 | O'Mara et al. ................... 705/38 |
| 2002/0133606 | A1 * | 9/2002 | Mitomo et al. ................ 709/229 |
| 2004/0024694 | A1 * | 2/2004 | Lawrence et al. ............... 705/38 |
| 2004/0215574 | A1 * | 10/2004 | Michelsen et al. .............. 705/64 |
| 2005/0193430 | A1 * | 9/2005 | Cohen et al. ..................... 726/25 |
| 2006/0015377 | A1 * | 1/2006 | Hoogs et al. ....................... 705/7 |
| 2006/0036560 | A1 * | 2/2006 | Fogel .............................. 706/45 |
| 2006/0173812 | A1 * | 8/2006 | Bahl et al. .......................... 707/2 |
| 2006/0212407 | A1 * | 9/2006 | Lyon ............................... 705/71 |
| 2008/0298573 | A1 * | 12/2008 | Monk ........................... 379/189 |
| 2011/0231258 | A1 * | 9/2011 | Winters .................... 705/14.53 |

OTHER PUBLICATIONS

"The card companies fight to scrub laundering." (1993). Credit Card News, 6(2), 4. (Retrieved from http://search.proquest.com/docview/201109317?accountid=14753).*
Green, Jeffrey, Stepping up the fraud fight, Credit Card Management; Oct. 1998; 11, 7;.*

* cited by examiner

*Primary Examiner* — Kambiz Abdi
*Assistant Examiner* — Joan Goodbody
(74) *Attorney, Agent, or Firm* — Armstrong Teasdale LLP

(57) ABSTRACT

A method for assessing sales activity of a merchant using a computer system coupled to a database is provided. The sales activity includes purchases made by a customer using a financial transaction card over a financial transaction card network. The method includes storing within the database a plurality of merchant profiles wherein each merchant profile describes a customer community of the corresponding merchant utilizing the financial transaction card network, determining a violator merchant profile based on a customer community associated with a violator merchant wherein the violator merchant uses the financial transaction card network to engage in at least one of illegal, potentially illegal and undesirable sales activities with at least a portion of the associated customer community, comparing the violator merchant profile to each merchant profile stored within the database, and identifying at least one potential violator merchant for further investigation based on the comparison.

23 Claims, 4 Drawing Sheets

METHODS AND SYSTEMS FOR ASSESSING SALES ACTIVITY OF A MERCHANT

BACKGROUND OF THE INVENTION

This invention relates generally to a method and system for assessing sales activity of a merchant, and more particularly to a network-based system and method for assessing the sales activity of a merchant to identify illegal or brand damaging merchant activity.

Financial transaction cards have made great gains in the United States as a means to attract financial accounts to financial institutions and, in the case of credit cards, as a medium to create small loans and generate interest income for financial institutions. Nonetheless, the financial transaction card industry is subject to certain well-known problems.

Taking the credit card industry, for example, it is well-known that at least some merchants will engage in illegal or potentially illegal activities, or activities otherwise undesirable to some of the parties involved in the transaction. Specifically, a merchant may engage in the sale of illegal pharmaceuticals, child pornography, or terrorism related products. At least some of these undesirable merchants may offer these illegal or potentially illegal products for sale over the Internet, through the mail system or via telephone orders, wherein the product is purchased using a financial transaction card such as a credit card. The other parties involved in such a credit card transaction, namely the acquirer bank, the credit card network, and the issuer bank, do not want to be involved in such illegal or potentially illegal transactions. Accordingly, at least some of these parties will work to shut down such undesirable merchants.

When the relationship between an illegal or potentially illegal merchant and an acquirer bank is terminated, they oftentimes attempt to re-establish a relationship with another acquirer bank. At that time, such undesirable merchants may send out emails to their past customers informing their past customers that they have re-opened for business. These undesirable merchants are sometimes referred to as "violator" merchants or BRAM merchants. BRAM refers to Business Risk Assessment & Migration (BRAM), which is a program used by MasterCard International Incorporated for eliminating illegal or brand damaging merchants.

In at least some known cases, customers of BRAM merchants will move their business elsewhere when the merchant's relationship with an acquirer is terminated in order to find another source for these illegal or potentially illegal products. In some cases, BRAM merchants will have multiple merchant agreements with acquirers appearing to be different merchants. In addition, certain categories of BRAM merchants will attract common card holders because of addictive behavior (e.g., pharmaceuticals and pornography) or firmly held principals (e.g., terrorism). In some cases, notification channels exist among these consumer communities relative to BRAM merchants.

It is also known that at least some BRAM merchant customers are repeat customers. BRAM merchant customers are also typically geographically diverse and are not likely to make purchases at another non-BRAM merchant.

In at least some cases, credit card networks (e.g., MasterCard®) will try to locate BRAM merchants and then work to shut them down. At least one known way of a credit card network locating BRAM merchants is to use web crawlers or by receiving phone or email solicitations. Unfortunately, these approaches are reactive and there are delays in identifying violator merchants.

Accordingly, a system and method for proactively assessing the sales activity of a merchant to determine whether that merchant is engaging in illegal or potentially illegal activities is needed. The system and method would identify potential violator merchants by utilizing credit card transaction details of known violator merchants to create a violator profile database, and then, on an on-going basis, compare customer profiles for active merchants to the violator profile database.

BRIEF DESCRIPTION OF THE INVENTION

In one aspect, a method for assessing sales activity of a merchant using a computer system coupled to a database is provided. The sales activity includes purchases made by a customer using a financial transaction card over a financial transaction card network. The method includes storing within the database a plurality of merchant profiles wherein each merchant profile describes a customer community of the corresponding merchant utilizing the financial transaction card network, determining a violator merchant profile based on a customer community associated with a violator merchant wherein the violator merchant uses the financial transaction card network to engage in at least one of illegal, potentially illegal and undesirable sales activities with at least a portion of the associated customer community, comparing the violator merchant profile to each merchant profile stored within the database, and identifying at least one potential violator merchant for further investigation based on the comparison between the violator merchant profile and the merchant profiles stored within the database.

In another aspect, a network-based system for assessing sales activity of a merchant including purchases made by a customer using a financial transaction card over a financial transaction card network is provided. The system includes a client system comprising a browser, a database for storing consumer related information, and a server system configured to be coupled to the client system and the database. The server is further configured to store within the database a plurality of merchant profiles wherein each merchant profile describes a customer community of the corresponding merchant utilizing the financial transaction card network, determine a violator merchant profile based on a customer community associated with a violator merchant wherein the violator merchant uses the financial transaction card network to engage in at least one of illegal, potentially illegal and undesirable sales activities with at least a portion of the associated customer community, compare the violator merchant profile to each merchant profile stored within the database, and determine whether to investigate at least one potential violator merchant based on the comparison between the violator merchant profile and the merchant profiles stored within the database.

In another aspect, a computer for assessing sales activity of a merchant including purchases made by a customer using a financial transaction card over a financial transaction card network is provided. The computer is programmed to store within the database a plurality of merchant profiles wherein each merchant profile describing a customer community of the corresponding merchant utilizing the financial transaction card network, determine a violator merchant profile based on a customer community associated with a violator merchant wherein the violator merchant uses the financial transaction card network to engage in at least one of illegal, potentially illegal and undesirable sales activities with at least a portion of the associated customer community, compare the violator merchant profile to each merchant profile stored within the database, and determine whether to investigate at least one potential violator merchant based on the comparison between the violator merchant profile and the merchant profiles stored within the database.

In another aspect, a computer program embodied on a computer readable medium for assessing sales activity of a merchant is provided. The sales activity includes purchases made by a customer using a financial transaction card over a financial transaction card network. The program includes at least one code segment that stores within a database a plurality of merchant profiles wherein each merchant profile describes a customer community of the corresponding merchant utilizing the financial transaction card network, determines a violator merchant profile based on a customer community associated with a violator merchant wherein the violator merchant uses the financial transaction card network to engage in at least one of illegal, potentially illegal and undesirable sales activities with at least a portion of the associated customer community, compares the violator merchant profile to each merchant profile stored within the database, and identifies at least one potential violator merchant for further investigation based on the comparison between the violator merchant profile and the merchant profiles stored within the database.

DETAILED DESCRIPTION OF THE INVENTION

Figure 1:
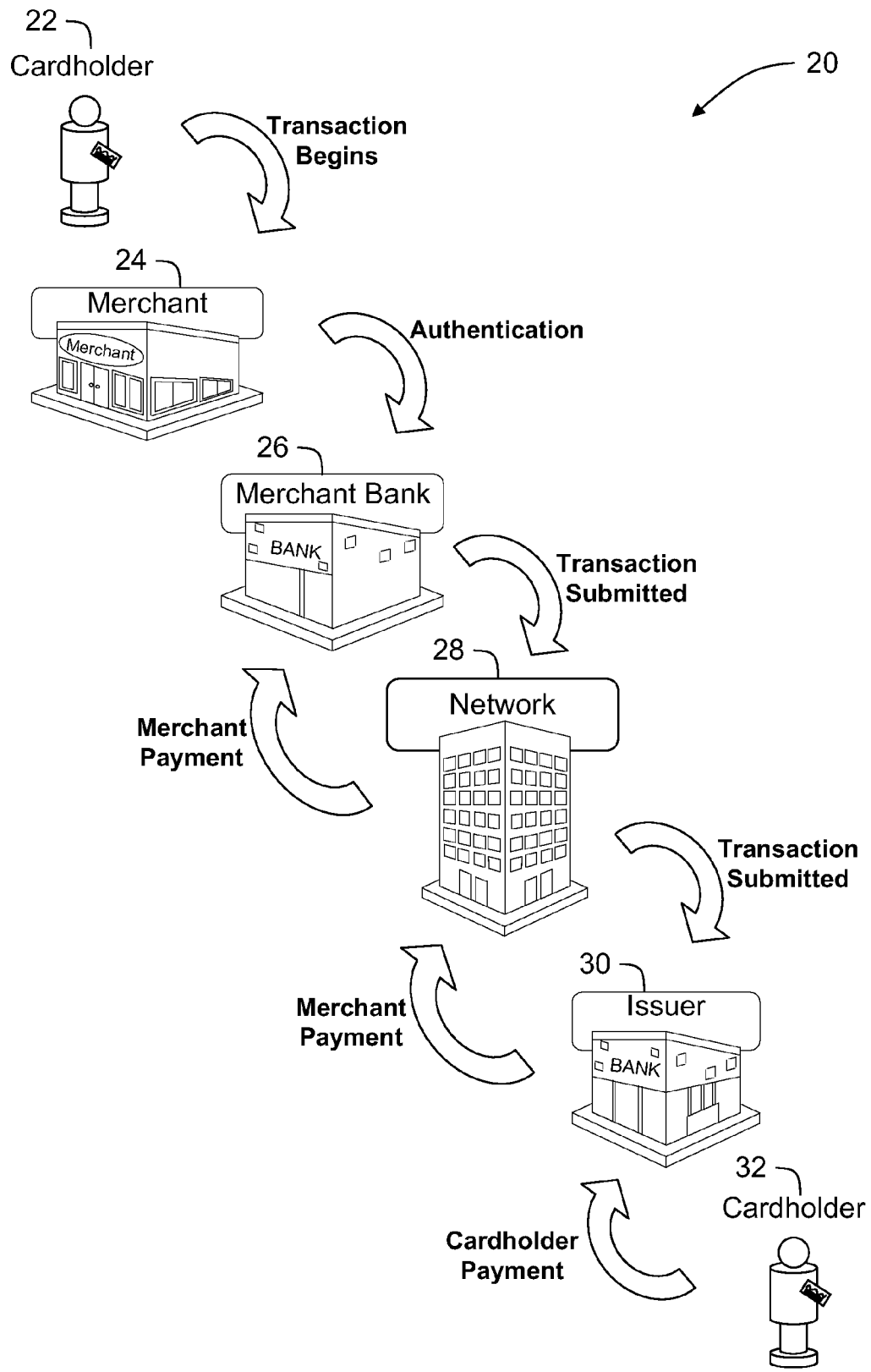
FIG. 1 is a flowchart illustrating a typical financial transaction using a financial transaction card payment system.

Described in detail herein are exemplary embodiments of systems and processes that facilitate assessing the sales activity of a merchant to determine whether the merchant is a violator or BRAM merchant. As explained above, a BRAM merchant refers to Business Risk Assessment & Migration. In other words, a BRAM merchant, also known as a violator merchant, is a merchant that engages in illegal or potentially illegal sales activity, or activities otherwise undesirable to some of the parties involved in the transaction. For example, BRAM merchants may engage in the sales of illegal pharmaceuticals, child pornography or terrorism related products. Once a potential BRAM merchant is identified using the systems and processes described herein, the entity operating the financial transaction card network or interchange (e.g., MasterCard®) would then work with the acquiring bank to investigate the merchant and, if the merchant is determined to be a violator, terminate the merchant's access to the network (MasterCard is a registered trademark of MasterCard International Incorporated located in Purchase, N.Y.).

The systems and processes facilitate, for example, electronic submission of information using a client system, automated extraction of information, and web-based reporting for internal and external system users. A technical effect of the systems and processes described herein include at least one of (a) determining, on an ongoing basis, a merchant profile for each merchant utilizing the financial transaction card network or interchange, wherein each merchant profile includes at least one of customer card numbers, cardholder names, and cardholder demographics for each customer making purchases from the merchant using a financial transaction card during a predetermined period of time; (b) after an investigation confirms that a merchant is a violator merchant, capturing the merchant profile for the violator merchant including historical sales data with a customer community, wherein the violator merchant profile of the customer community includes a list of customer card numbers, cardholder names, and cardholder demographics for each customer making purchases from the violator merchant during a predetermined period of time; (c) storing the violator merchant profile in a violator database along with other violator profiles based on a type of violation including at least one of child pornography, illegal pharmaceuticals, and terrorism; (d) comparing the merchant profile of each merchant using the financial transaction card network with the violator merchant profile stored in the violator database including performing a statistical analysis to determine whether a predetermined degree of correlation exists between the violator merchant profile and any of the merchant profiles of existing merchants; and (e) identifying any potential violator merchants for further investigation based on the comparison between the violator merchant profile and each merchant profile of existing merchants. If a potential violator merchant is identified, then a new BRAM investigation is opened.

In addition, the systems and processes described herein may include (f) on a regular basis, comparing the merchant profiles of each active merchant to the violator merchant profiles stored in the violator database including performing a statistical analysis to determine whether a predetermined degree of correlation exists between any of the merchant profiles of the active merchants and any of the violator merchant profiles stored in the violator database. If a correlation exists, a new BRAM investigation will be opened.

In one embodiment, a computer program is provided, and the program is embodied on a computer readable medium and utilizes a Structured Query Language (SQL) with a client user interface front-end for administration and a web interface for standard user input and reports. In an exemplary embodiment, the system is web enabled and is run on a business-entity intranet. In yet another embodiment, the system is fully accessed by individuals having an authorized access outside the firewall of the business-entity through the Internet. In yet another embodiment, the system is run on a mainframe environment and a UNIX® server environment (UNIX is a registered trademark of AT&T, New York, N.Y.). In a further exemplary embodiment, the system is being run in a Windows® environment (Windows is a registered trademark of Microsoft Corporation, Redmond, Wash.). The application is flexible and designed to run in various different environments without compromising any major functionality.

The systems and processes are not limited to the specific embodiments described herein. In addition, components of each system and each process can be practiced independent and separate from other components and processes described herein. Each component and process also can be used in combination with other assembly packages and processes.

FIG. 1 is a flowchart 20 illustrating a typical financial transaction using a financial transaction card payment system. The present invention is related to a financial transaction card payment system, such as a credit card payment system using the MasterCard® interchange. The MasterCard® interchange is a proprietary communications standard promulgated by MasterCard International Incorporated® for the exchange of financial transaction data between financial institutions that are members of MasterCard International Incorporated®.

In a typical financial payment system, a financial institution called the "issuer" issues a financial transaction card, such as a credit card, to a consumer, who uses the financial transaction card to tender payment for a purchase from a merchant. To accept payment with the financial transaction card, the merchant must normally establish an account with a financial institution that is part of the financial payment system. This financial institution is usually called the "merchant bank" or the "acquiring bank" or "acquirer bank." When a consumer 22 tenders payment for a purchase with a financial transaction card, the merchant 24 requests authorization from the merchant bank 26 for the amount of the purchase. The request may be performed over the telephone, but is usually performed through the use of a point-of-sale terminal, which reads the consumer's account information from the magnetic stripe on the financial transaction card and communicates electronically with the transaction processing computers of the merchant bank. Alternatively, a merchant bank may authorize a third party to perform transaction processing on its behalf. In this case, the point-of-sale terminal will be configured to communicate with the third party. Such a third party is usually called a "merchant processor" or an "acquiring processor."

Using the interchange 28, the computers of the merchant bank or the merchant processor will communicate with the computers of the issuer bank 30 to determine whether the consumer's account is in good standing and whether the purchase is covered by the consumer's available credit line. Based on these determinations, the request for authorization will be declined or accepted. If the request is accepted, an authorization code is issued to the merchant.

When a request for authorization is accepted, the available credit line of consumer's account 32 is decreased. Normally, a charge is not posted immediately to a consumer's account because bankcard associations, such as MasterCard International Incorporated®, have promulgated rules that do not allow a merchant to charge, or "capture," a transaction until goods are shipped or services are delivered. When a merchant ships or delivers the goods or services, the merchant captures the transaction by, for example, appropriate data entry procedures on the point-of-sale terminal. If a consumer cancels a transaction before it is captured, a "void" is generated. If a consumer returns goods after the transaction has been captured, a "credit" is generated.

After a transaction is captured, the transaction is settled between the merchant, the merchant bank, and the issuer. Settlement refers to the transfer of financial data or funds between the merchant's account, the merchant bank, and the issuer related to the transaction. Usually, transactions are captured and accumulated into a "batch," which are settled as a group.

Financial transaction cards or payment cards can refer to credit cards, debit cards, and prepaid cards. These cards can all be used as a method of payment for performing a transaction. As described herein, the term "financial transaction card" or "payment card" includes cards such as credit cards, debit cards, and prepaid cards, but also includes any other devices that may hold payment account information, such as mobile phones, personal digital assistants (PDAs), and key fobs.

Figure 2:
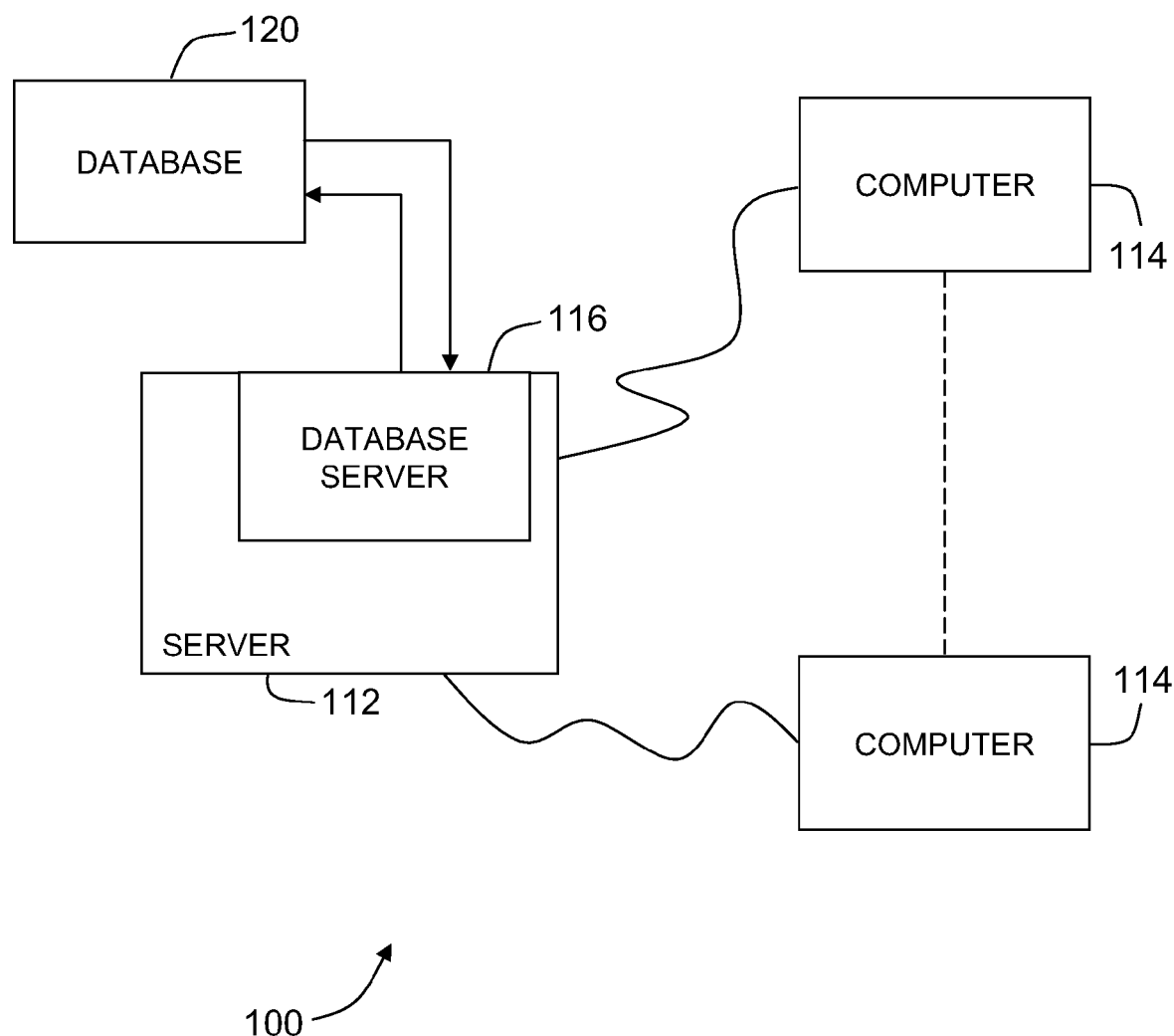
FIG. 2 is a simplified block diagram of an exemplary embodiment of a server architecture of a system in accordance with one embodiment of the present invention.

FIG. 2 is a simplified block diagram of an exemplary system 100 in accordance with one embodiment of the present invention. In one embodiment, system 100 is the financial transaction card payment system shown in FIG. 1, which can be utilized for assessing the sales activity of merchants. More specifically, in the example embodiment, system 100 includes a server system 112, and a plurality of client sub-systems, also referred to as client systems 114, connected to server system 112. In one embodiment, client systems 114 are computers including a web browser, such that server system 112 is accessible to client systems 114 using the Internet. Client systems 114 are interconnected to the Internet through many interfaces including a network, such as a local area network (LAN) or a wide area network (WAN), dial-in-connections, cable modems and special high-speed ISDN lines. Client systems 114 could be any device capable of interconnecting to the Internet including a web-based phone, personal digital assistant (PDA), or other web-based connectable equipment. A database server 116 is connected to a database 120 containing information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

As discussed below, merchant profiles are stored within database 120. Data relating to BRAM merchant profiles may also be stored within database 120. A merchant profile may include the card account numbers that have used a merchant over a period of time, the names of the cardholders, and the demographics of the cardholders. The profile may also include summarized transaction data for purchases made between the cardholders and the merchants.

Figure 3:
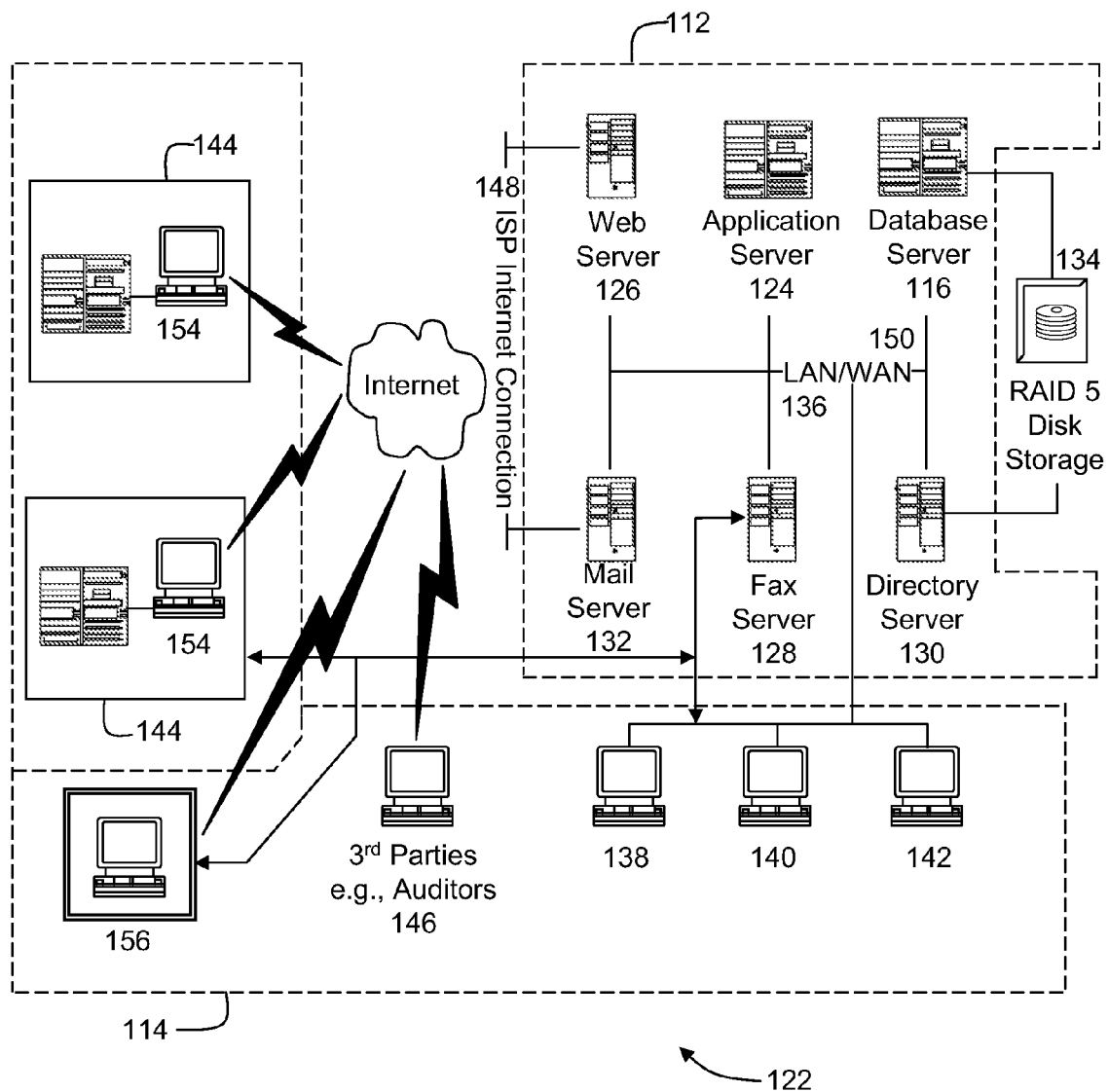
FIG. 3 is an expanded block diagram of an exemplary embodiment of a server architecture of a system in accordance with one embodiment of the present invention.

FIG. 3 is an expanded block diagram of an exemplary embodiment of a server architecture of a system 122 in accordance with one embodiment of the present invention. Components in system 122, identical to components of system 100 (shown in FIG. 2), are identified in FIG. 3 using the same reference numerals as used in FIG. 2. System 122 includes server system 112 and client systems 114. Server system 112 further includes database server 116, an application server 124, a web server 126, a fax server 128, a directory server 130, and a mail server 132. A disk storage unit 134 is coupled to database server 116 and directory server 130. Servers 116, 124, 126, 128, 130, and 132 are coupled in a local area network (LAN) 136. In addition, a system administrator's workstation 138, a user workstation 140, and a supervisor's workstation 142 are coupled to LAN 136. Alternatively, workstations 138, 140, and 142 are coupled to LAN 136 using an Internet link or are connected through an Intranet.

Each workstation, 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., auditors, 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
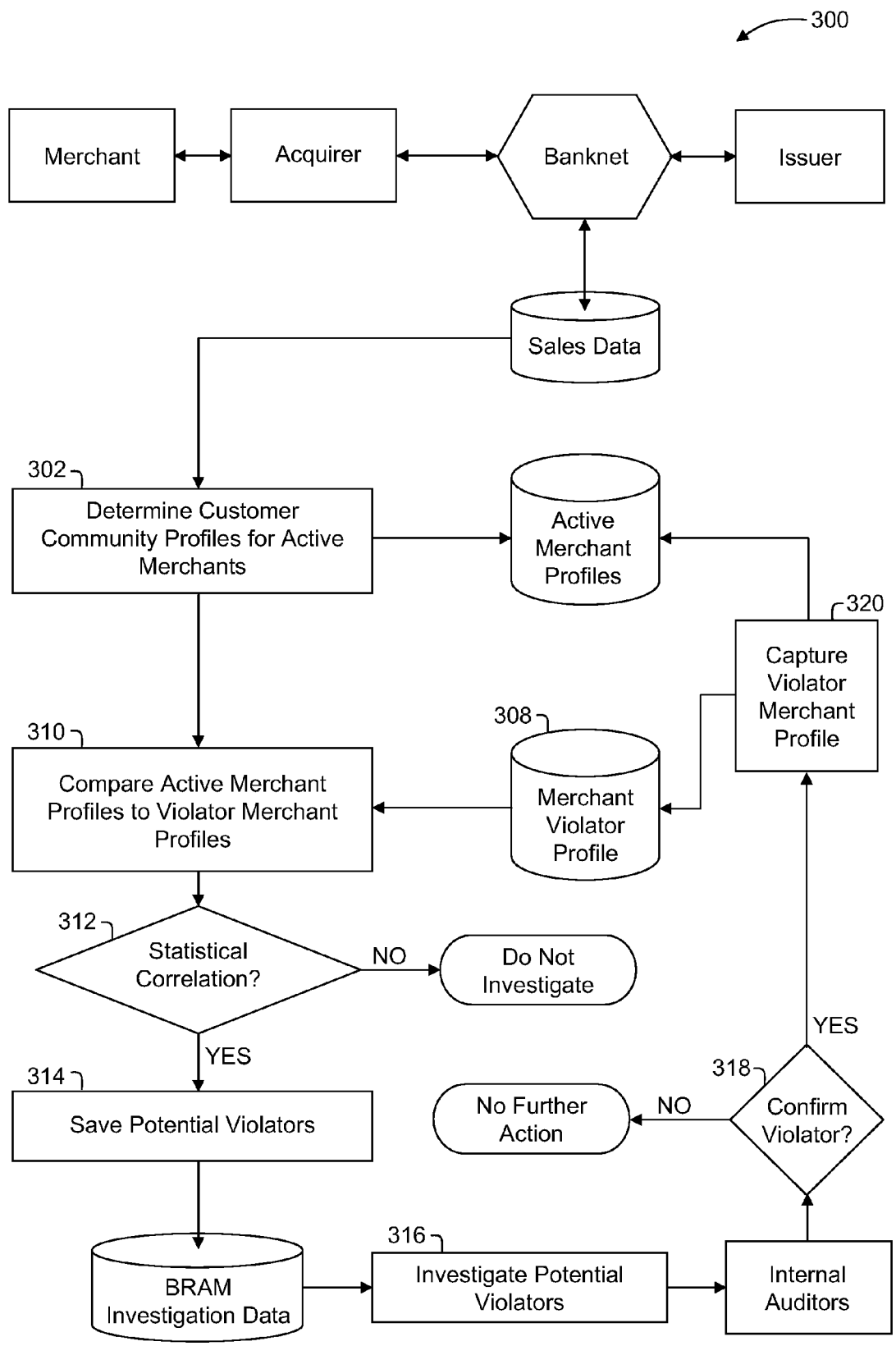
FIG. 4 is a flowchart illustrating exemplary processes utilized by the system shown in FIG. 2.

FIG. 4 is a flowchart 300 illustrating exemplary processes utilized by system 100 shown in FIG. 2. System 100 is sometimes referred to as the financial transaction card payment system, which can be utilized for assessing the sales activity of merchants. In the example embodiment, system 100 may be utilized by an "issuer" who issues a financial transaction card, a consumer who uses the financial transaction card to tender payment for a purchase from a merchant, a merchant who sells a product, a "merchant bank" or an "acquiring bank", and a credit card network or interchange for processing a financial transaction. System 100 may also be utilized by the credit card network or interchange to assess the sales activities of merchants using the system.

In the example embodiment, system 100 facilitates assessing the sales activity of a merchant to determine whether the merchant is a BRAM merchant. The technical effect of the processes and systems described herein is achieved by accessing the sales data from the financial transaction network to determine 302 a profile of each merchant utilizing system 100 on an ongoing basis. The merchant profiles are stored within a database of active merchant profiles. Each profile, which is also referred to as a merchant or customer community profile, includes a summary of the customers for the corresponding merchant that made at least one purchase from the merchant using a transaction card, and further includes the corresponding transaction card number used in making the purchases, and information relating to each customer using the transaction cards. For each merchant using system 100, the merchant profile is defined based on sales data from the clearing system, and is updated on an ongoing basis. The system may remove customers from the merchant profile database after a predetermined period of time without activity to keep the profiles fresh.

System 100 stores 308 the newly captured violator merchant profile in a violator database along with other, previously stored, violator profiles based on a type of violation including at least one of child pornography, illegal pharmaceuticals, and terrorism. The violator profile of the customer community includes a list of customer card numbers, cardholder names, and cardholder demographics for each customer making purchases from the violator merchant during a predetermined period of time. The system then compares 310 the merchant profile of each merchant using the financial transaction card network with the violator merchant profiles stored in the violator database including performing a statistical analysis to determine 312 whether a predetermined degree of correlation exists between the violator merchant profiles and any of the merchant profiles of existing merchants. In addition, system 100 can be configured to exempt commonly used merchants that are known to conduct legitimate business to reduce false positives and to speed operation. To accomplish this, a legitimate merchant exception list can be used and stored with the database.

If the comparison shows a statistical correlation, system 100 identifies 314 a potential violator merchant for further investigation. The information relating to the potential violator merchant is then saved to a BRAM investigation database along with a degree of correlation for prioritization purposes. If there is not statistical correlation, the merchant is not investigated.

The potential violator merchants are presented 316 to internal auditors in priority order, reviewed, and investigated cases are opened as the auditors determine appropriate. The auditors then manually work with the acquiring bank to gain more information on the investigated merchant and the type of business they are conducting. If an investigation reveals a legitimate merchant, no further action is taken.

If an investigation confirms 318 that the potential merchant violator is a BRAM merchant, then systems 100 captures 320 the merchant profile for this violator merchant and stores it in the violator merchant profile database. The violator merchant profile of the customer community includes those cardholders with at least one purchase from the BRAM merchant and information relating to each cardholders The new violator merchant profiles will be compared with the active merchant profiles as they are identified and will be part of the on-going comparisons.

In the example embodiment, each customer community profile determined for each merchant includes a group of customer card numbers used in transactions at the particular merchant. In alternative embodiments, the profile definition for each customer community would be extended to also include the name of the actual cardholder and cardholder demographics. By profiling on the actual cardholder, the system will also be able to account for cardholders using multiple cards or when new cards are issued to the cardholders By profiling the cardholder demographics, the system will also be able to uncover BRAM merchants with a completely different cardholder community. For example, customers of a child pornography website might typically consist of 95% unmarried males, age 30+, from geographically diverse areas. By examining the demographics of a merchant's customers, additional potential violators may be discovered resulting in the identification of additional potential BRAM merchants.

System 100 utilizes merchant profiling to proactively supply a prioritized list of potential BRAM merchants to investigate. From this list, investigators can select merchants to investigate further. Investigations on selected merchants will typically begin by contacting the acquirer to get copies of the merchant agreements. This merchant agreement will be compared to look for information to tie back to previous violators. In addition, in some cases the information will be used to contact the merchants directly in an attempt to discover their Internet site or phone number so that a purchase can be made for proof of violation. The effectiveness of this approach will grow with each confirmed BRAM violation, resulting in a larger set of violator profiles.

More specifically, the system and process described herein are triggered when a merchant using the financial transaction payment card system is confirmed to be a BRAM merchant. When a BRAM violation is confirm, system 100 determines a profile for a customer community of the newly identified BRAM merchant. The newly identified BRAM merchant profile is used to look back at historical transactions for potential violators. To accomplish this task, the following steps are performed: (a) determine and record a specific violation type from a list of possible types of the newly identified BRAM merchant; (b) capture a set of card numbers used at the newly identified BRAM merchant over at least the previous four months and record this profile in the BRAM violator database; and (c) compare this customer community profile for the newly identified BRAM merchant to profiles of all current merchants based on at least the previous four months.

System 100 performs a statistical analysis to determine whether a predetermined degree of correlation exists between the customer community profile for the newly identified BRAM merchant and the profiles of all current merchants based on at least the previous four months. In the example embodiment, if at least 25% of the card numbers used at an active merchant match the card numbers of the newly identified BRAM merchant than that active merchant is added to a list of potential BRAM violators.

In the example embodiment, system 100 is also configured to be used for monitoring existing merchants. As discussed above, merchant profiles for existing merchants will be determined and stored in a database. The existing merchant profiles will then be compared to the merchant profiles stored in the BRAM violator database on a continual basis. For example, every week or some other predetermined period of time, card numbers used at an active merchant would be compared with the card numbers from each BRAM merchant profile stored in the BRAM violator database. Any statistically significant matches (e.g., at least 10% of the card numbers matching) would result in that active merchant being added to the list of potential BRAM violators.

System 100 is further configured to display the list of potential BRAM merchants to investigators for further review and determination as to whether the potential BRAM merchants are actual BRAM merchants. The displayed list would also include details about each merchant including the matching profiles. The investigators could then decide whether to open an investigation or exclude the listed merchant permanently from the potential BRAM violator list.

In the example embodiment, the potential BRAM violator list would include at least one of an acquirer ID number, a merchant ID number, a merchant name, a merchant location, a merchant category code (MCC), a number of BRAM violation profiles matched, a probable type of violation, and a maximum degree of correlation.

From the BRAM violator list, an investigator could further select to see details of the matching profiles stored in the BRAM violator database. For example, system 100 is configured to display at least the following information for each matching violation profile (i.e., information relating to the BRAM violator merchants stored in the BRAM violators database that match with the merchants added to the potential BRAM violators list): merchant name, violation type, date violation was confirmed, degree of correlation with potential BRAM violator, date range, and average daily sales volume.

In the example embodiment, if the investigator chooses to open a new investigation, a new BRAM case will be created and loaded with information about the potential violator. If, however, the investigator chooses to exclude a merchant from further investigation, the system will save the merchant to a list of excluded merchant. This merchant will then be excluded from future merchant profiling analysis. The ability to exclude a merchant from profiling analysis can be helpful to avoid nuisance identification of large merchants.

System 100 is configured to store the BRAM merchant profiles for a period of time. However, over time, the violator profiles will grow stale as financial transaction cards are re-issued. Accordingly, the profiles stored within system 100 will also expire. System 100 is configured to automatically expire or remove BRAM merchant profiled stored within the system when the majority of the card numbers included within the profile also expire. Alternatively, system 100 could be configured to limit the BRAM merchant profiles stored to a maximum number for each type of BRAM violation. In addition, system 100 is configured to enable a user, such as a system administrator, to manually remove BRAM merchant profiles that are stale and/or yielding false positives.

System 100 is configured to compare existing merchant profiles to the merchant profiles stored in the BRAM violator database. The comparison includes performing a statistical analysis to determine whether a predetermined degree of correlation exists between the BRAM merchant profile and any of the historical profiles of existing merchants. In the example embodiment, the degree of correlation may include a percentage range of matching credit card numbers, cardholder names or other cardholder information. For example, a range between 10% and 25% of matching card numbers may be sufficient to warrant including the merchant on the list of potential BRAM violators. The minimum correlation threshold for including a merchant on the list of potential violators would be reviewed and could be adjusted based on empirical data over a period of time.

In addition, if an acquirer terminates a merchant for a BRAM violation that transaction card network (e.g., MasterCard®) did not investigate, the information from the acquirer could be transmitted to system 100 so that the profile of the terminated merchant could be used in the profiling process. The information provided from the acquirer would be stored with system 100. System 100 would assign a violation type to the transmitted information and would process the information as described herein.

The systems and processes described herein could also be used for financial transactions that are "card not present transactions (e.g., telephone, Internet type transactions) which are oftentimes the most typical BRAM type transactions. The systems and processes described herein could also be applied to finding MCC coding violations and merchant aggregators. For example, non-U.S. Internet gambling merchants sometimes intentionally miscode the transaction because U.S. issuers block these illegal transactions. The profile for an Internet gambling merchant could be used to find other Internet gambling merchants that might miscode the transactions. The profile of these Internet gambling merchants could be limited to only the U.S. issued card numbers to be most effective and optimized.

In another embodiment, a computer and a computer program are provided which are configured or programmed to perform steps similar to those already recited herein.

The systems and processes described herein enable a user, such as a financial transaction card network (e.g., MasterCard®), to assess the sales activity of a merchant to determine whether the merchant is a BRAM merchant. Once a potential BRAM merchant is identified using the systems and processes described herein, the transaction card network would then work to terminate the relationship between the BRAM merchant and their acquiring bank. The system described herein stores a customer community profile of each merchant utilizing the transaction card network or interchange, wherein each profile includes a transaction history including a summary of purchases made by a customer of the merchant; after an investigation confirms that a merchant is a BRAM merchant, determines a profile for a customer community of the BRAM merchant, wherein the profile of the customer community includes a transaction history of each customer with the BRAM merchant; compares the BRAM merchant profile to each profile of existing merchants including performing a statistical analysis to determine whether a predetermined degree of correlation exists between the BRAM merchant profile and any of the historical profiles of existing merchants; and identifies any potential BRAM merchants for further investigation based on the comparison between the BRAM merchant profile and each merchant profile of existing merchants. The BRAM merchant profile is stored in a BRAM violator database based on a type of violation including at least one of child pornography, illegal pharmaceuticals, and terrorism; and on a regular basis, compares the profiles of each active merchant to the merchant profiles stored in the BRAM violator database including performing a statistical analysis to determine whether a predetermined degree of correlation exists between any of the historical profiles of the active merchants and any of the merchant profiles stored in the BRAM violator database. If so, a new BRAM investigation will be opened.

While the invention has been described in terms of various specific embodiments, those skilled in the art will recognize that the invention can be practiced with modification within the spirit and scope of the claims.

What is claimed is:

1. A method for assessing sales activity of a merchant using a computer system coupled to one or more databases, the sales activity including purchases made by cardholders from a plurality of merchants, the cardholders using the cardholders' own financial transaction card, the sales activity conducted over a financial transaction card network, said method comprising the steps of:

generating and storing within a merchant profile database, a profile for each of the plurality of merchants, each merchant profile comprising an account identifier corresponding to each financial transaction card used by the cardholders in at least one transaction with the merchant associated with the merchant profile;

storing within a violator merchant profile database, a profile for each of one or more violator merchants, wherein the violator merchant profile includes a list of financial transaction card numbers for each cardholder that made valid purchases from the violator merchant during a predetermined period of time;

periodically comparing, at a predetermined frequency, a stored violator merchant profile to one or more stored merchant profiles using statistical analysis to determine a degree of correlation between the stored violator merchant profile and of the one or more stored merchant profiles, the comparison performed by the computer;

identifying at least one potential violator merchant for further investigation based on the comparison between the violator merchant profile and the merchant profiles; and storing the merchant profile of the at least one potential violator merchant as a violator merchant profile in the violator merchant profile database after an investigation determines the potential violator merchant is a violator merchant, the violator merchant defined as a merchant using the financial transaction card network to engage in at least one of a sale of an illegal product using a financial transaction card, and a sale of a potentially illegal product using a financial transaction card, each violator merchant profile stored in a violation category along with other violator merchant profiles based on a type of violation.

2. The method of claim 1 wherein the account identifier comprises card numbers corresponding to each financial transaction card used by a cardholder in at least one transaction with the merchant.

3. The method of claim 1 wherein storing within the violator merchant profile database further comprises storing within the violator merchant profile database a plurality of violator merchant profiles, each violator merchant profile including a card number, a name of a cardholder, and cardholder demographics for each financial transaction card used in at least one transaction with the merchant.

4. The method of claim 1 wherein periodically comparing the stored violator merchant profile to one or more stored merchant profile further comprises determining whether a predetermined degree of correlation exists between the violator merchant profile and any of the merchant profiles stored within the merchant profile database.

5. The method of claim 1 further comprising:

storing the violator merchant profiles in the violator merchant profile database based on the violation category including at least one of a pharmaceutical violation, a pornography violation and a terrorism violation;

automatically comparing, on a predetermined basis, the violator merchant profiles to the merchant profiles including determining whether a predetermined degree of correlation exists there between; and generating a list of potential violator merchants based on the comparison including organizing each potential violator merchant listed by violation category.

6. The method of claim 5 wherein generating a list of potential violator merchants further comprises displaying on the computer a list of potential violator merchants, wherein each displayed violator merchant further includes information relating to the merchant including an acquirer ID number, a merchant ID number, a merchant name, a merchant location, a merchant category code (MCC), a number of violation profiles matched, a probable type of violation, and a maximum degree of correlation.

7. A network-based system for assessing sales activity of a merchant including purchases made by a customer using a financial transaction card over a financial transaction card network, said system comprising:

a client system comprising a browser;

a merchant profile database for storing merchant profile information; and a server system configured to be coupled to said client system and said database, said server further configured to:

generate and store within the database a plurality of merchant profiles, each merchant profile describing a customer community of the corresponding merchant utilizing the customer's own financial transaction card to make purchases from the merchant using the financial transaction card network, each merchant profile comprising an account identifier corresponding to each financial transaction card used by a customer in at least one valid transaction with the merchant;

store within the database, a profile for each of one or more violator merchants, wherein the violator merchant profile includes a list of financial transaction card numbers for each cardholder that made valid purchases from the violator merchant during a predetermined period of time;

determine a violator merchant profile based on a customer community associated with a violator merchant, the customer community including customers that have made at least one valid purchase of an illegal product, a potentially illegal product, and a product determined to be undesirable to some of the parties involved in the transaction, the violator merchant using the financial transaction card network to engage in at least one of a sale of an illegal product using a financial transaction card, and a sale of a potentially illegal product using a financial transaction card, the sale made to a member of the customer community using the customer's own financial transaction card;

compare, at a predetermined interval, the violator merchant profile to each merchant profile stored within the database using statistical analysis to determine a degree of correlation between the violator merchant profile and each other merchant profile stored in the database;

determine whether to investigate at least one potential violator merchant based on the comparison between the violator merchant profile and the merchant profiles stored within the database; and store a profile of the at least one potential violator merchant in a violator merchant profile database if the investigation determines the potential violator merchant is a violator merchant, the profile stored along with other violator merchant profiles based on a violation category.

8. The system of claim 7 wherein the account identifier comprises card numbers corresponding to each financial transaction card used by a customer in at least one transaction with the merchant.

9. The system of claim 7 wherein each merchant profile comprises a card number, a name of a cardholder, and cardholder demographics for each financial transaction card used in at least one transaction with the merchant.

10. The system of claim 7 wherein said server system further configured to determine whether a predetermined degree of correlation exists between the violator merchant profile and any of the merchant profiles stored within the database.

11. The system of claim 7 wherein said server system further configured to:
store violator merchant profiles in the database based on a type of violation including at least one of pharmaceutical violation, pornography violation and terrorism violation;
automatically compare, on a predetermined basis, the violator merchant profiles to the merchant profiles including determining whether a predetermined degree of correlation exists there between; and
generate a list of potential violator merchants based on the comparison including organizing each potential violator merchant listed by violation type.

12. The system of claim 11 wherein said server system further configured to display a list of potential violator merchants, wherein each displayed violator merchant further includes information relating to the merchant including an acquirer ID number, a merchant ID number, a merchant name, a merchant location, a merchant category code (MCC), a number of violation profiles matched, a probable type of violation, and a maximum degree of correlation.

13. A computer system for assessing sales activity of a merchant including purchases made by a customer using the customer's own financial transaction card over a financial transaction card network, said computer comprising a processor in communication with a database:
said processor configured to:
generate and store within the database a plurality of merchant profiles, each merchant profile describing a customer community of the corresponding merchant utilizing the financial transaction card network, the customer community including customers that have made at least one purchase, using the customer's own financial transaction card, of an illegal product, a potentially illegal product, and a product determined to be undesirable to some of the parties involved in the transaction, each merchant profile comprising an account identifier corresponding to each financial transaction card used by a customer in at least one transaction with the merchant;
determine a violator merchant profile based on a customer community associated with a violator merchant, the violator merchant using the financial transaction card network to engage in at least one of a sale of an illegal product using a financial transaction card, a sale of a potentially illegal product using a financial transaction card, and a sale of a product determined to be undesirable to some of the parties involved in the transaction with others of the associated customer community;
compare the violator merchant profile to each merchant profile stored within the database using statistical analysis to determine a degree of correlation between the violator merchant profile and each other merchant profile stored in the database;
determine whether to investigate at least one potential violator merchant based on the comparison between the violator merchant profile and the merchant profiles stored within the database; and
store a profile of the at least one potential violator merchant in a violator merchant profile database if the investigation determines the potential violator merchant is a violator merchant, the profile stored along with other violator merchant profiles based on a type of violation.

14. The system of claim 13 wherein the account identifier comprises card numbers corresponding to each financial transaction card used by a customer in at least one transaction with the merchant.

15. The system of claim 13 wherein each merchant profile comprises a card number, a name of a cardholder, and cardholder demographics for each financial transaction card used in at least one transaction with the merchant.

16. The system of claim 13 wherein said computer further programmed to determine whether a predetermined degree of correlation exists between the violator merchant profile and any of the merchant profiles stored within the database.

17. The system of claim 13 wherein said computer further programmed to:
store violator merchant profiles in the database based on a type of violation including at least one of pharmaceutical violation, pornography violation and terrorism violation;
automatically compare, on a predetermined basis, the violator merchant profiles to the merchant profiles including determining whether a predetermined degree of correlation exists there between; and
generate a list of potential violator merchants based on the comparison including organizing each potential violator merchant listed by violation type.

18. The system of claim 17 wherein said computer further programmed to display a list of potential violator merchants, wherein each displayed violator merchant further includes information relating to the merchant including an acquirer ID number, a merchant ID number, a merchant name, a merchant location, a merchant category code (MCC), a number of violation profiles matched, a probable type of violation, and a maximum degree of correlation.

19. A computer program embodied on a non-transitory computer readable medium for assessing sales activity of a merchant including purchases made by a customer using a financial transaction card over a financial transaction card network, said program comprising at least one code segment that instructs a computer to:
generate and store within a database a plurality of merchant profiles, each merchant profile describing customers that have made purchases from the merchant using the customer's own financial transaction card utilizing the financial transaction card network and each merchant profile comprising an account identifier corresponding to each financial transaction card used by a customer in at least one transaction with the merchant;
store within a violator merchant profile database, a profile for each of one or more violator merchants, wherein the violator merchant profile includes a list of financial transaction card numbers for each cardholder that made valid purchases from the violator merchant during~ a predetermined period of time;

determine a potential violator merchant profile based on a customer community associated with a violator merchant, the violator merchant using the financial transaction card network to engage in at least one of a sale of an illegal product using a financial transaction card, and a sale of a potentially illegal product using a financial transaction card, with others of the associated customer community;

transmit at least one potential violator merchant profile to an internal auditor in a priority order for review;

receive, from the internal auditor, a determination that the potential violator merchant associated with the transmitted potential violator merchant profile, is a violator merchant;

compare the violator merchant profile to each merchant profile stored within the database using statistical analysis to determine a degree of correlation between the violator merchant profile and each other merchant profile stored in the database;

identify at least one potential violator merchant for further investigation based on the comparison between the violator merchant profile and the merchant profiles stored within the database; and store a profile of the at least one potential violator merchant in a violator merchant profile database if the investigation determines the potential violator merchant is a violator merchant, the profile stored along with other violator merchant profiles based on a type of violation.

20. The computer program of claim 19 further comprising at least one code segment that instructs the computer to store within the database a plurality of merchant profiles, wherein each merchant profile comprises at least one of a card number, a name of a cardholder, and cardholder demographics for each financial transaction card used in at least one transaction with the merchant.

21. The computer program of claim 19 further comprising at least one code segment that instruct the computer to determine whether a predetermined degree of correlation exists between the violator merchant profile and any of the merchant profiles stored within the database.

22. The computer program of claim 19 further comprising at least one code segment that instructs the computer to:

store violator merchant profiles in the database based on a type of violation including at least one of pharmaceutical violation, pornography violation and terrorism violation;

automatically compare, on a predetermined basis, the violator merchant profiles to the merchant profiles including determining whether a predetermined degree of correlation exists there between; and generate a list of potential violator merchants based on the comparison including organizing each potential violator merchant listed by violation type.

23. A method for assessing sales activity of a merchant using a computer system coupled to a database, the sales activity including purchases made by a customer using the customer's own financial transaction card over a financial transaction card network, said method comprising the steps of:

generating and storing within the database a plurality of merchant profiles, each merchant profile describing a customer community of the corresponding merchant utilizing the financial transaction card network and each merchant profile comprising an account identifier including card numbers corresponding to each financial transaction card used by a customer in at least one transaction with the merchant;

storing within the database, a profile for each of one or more violator merchants, wherein the violator merchant profile includes a list of financial transaction card numbers for each cardholder that made purchases from the violator merchant during a predetermined period of time;

determining a new violator merchant profile based on a customer community associated with the new violator merchant, the new violator merchant using the financial transaction card network to engage in at least one of a sale of an illegal product using a financial transaction card, and a sale of a potentially illegal product using a financial transaction card, with others of the associated customer community;

periodically comparing, at a predetermined frequency, the violator merchant profile to each merchant profile stored within the database using statistical analysis to determine a degree of correlation between the violator merchant profile and each other merchant profile stored in the database, the comparison performed by the computer; and identifying at least one potential violator merchant for further investigation based on the comparison between the violator merchant profile and the merchant profiles stored within the database.

* * * * *